J. FLETCHER.
STOP VALVE AND THE LIKE.
APPLICATION FILED MAR. 6, 1909.
959,728.
Patented May 31, 1910.
5 SHEETS—SHEET 1.
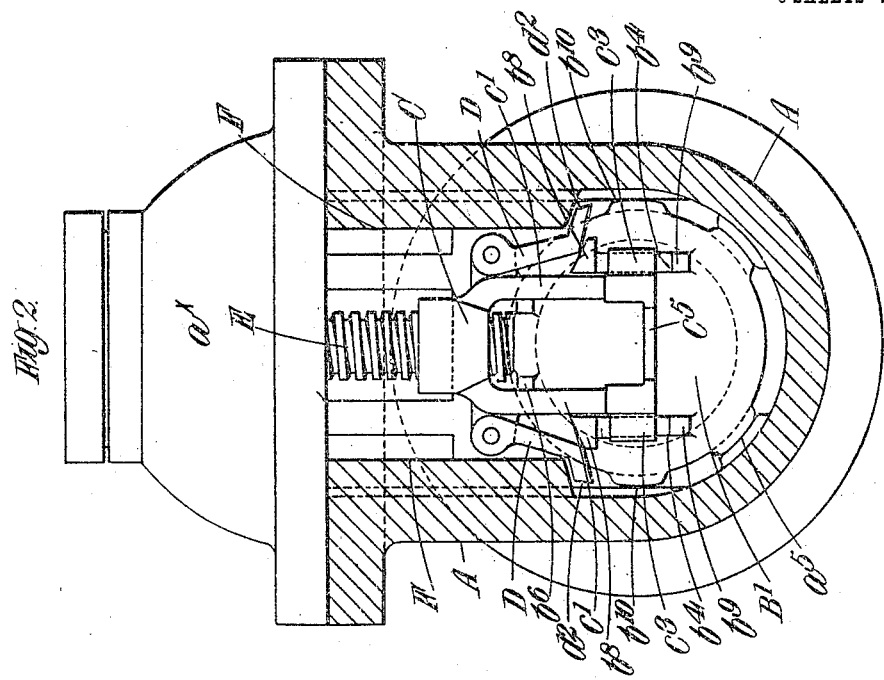
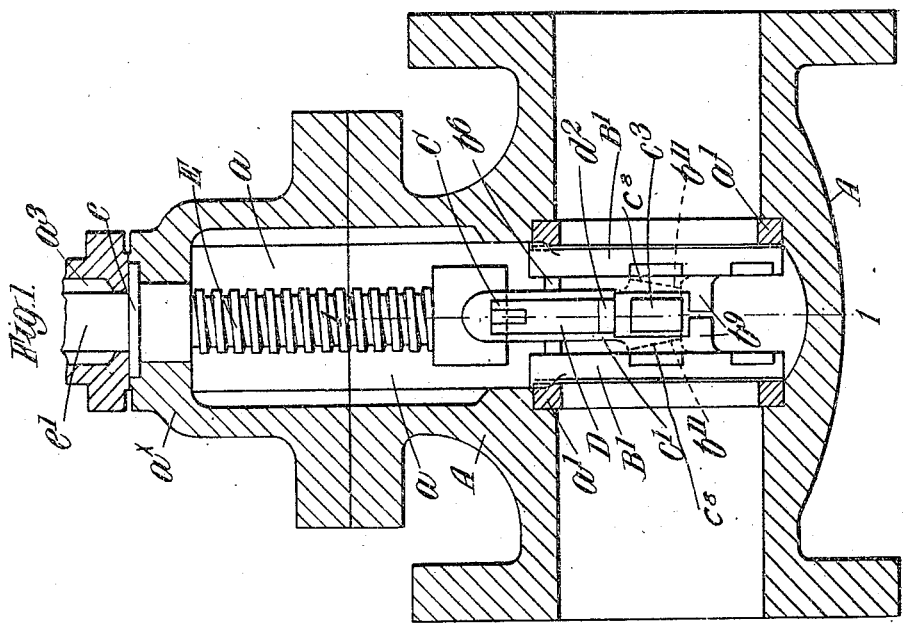

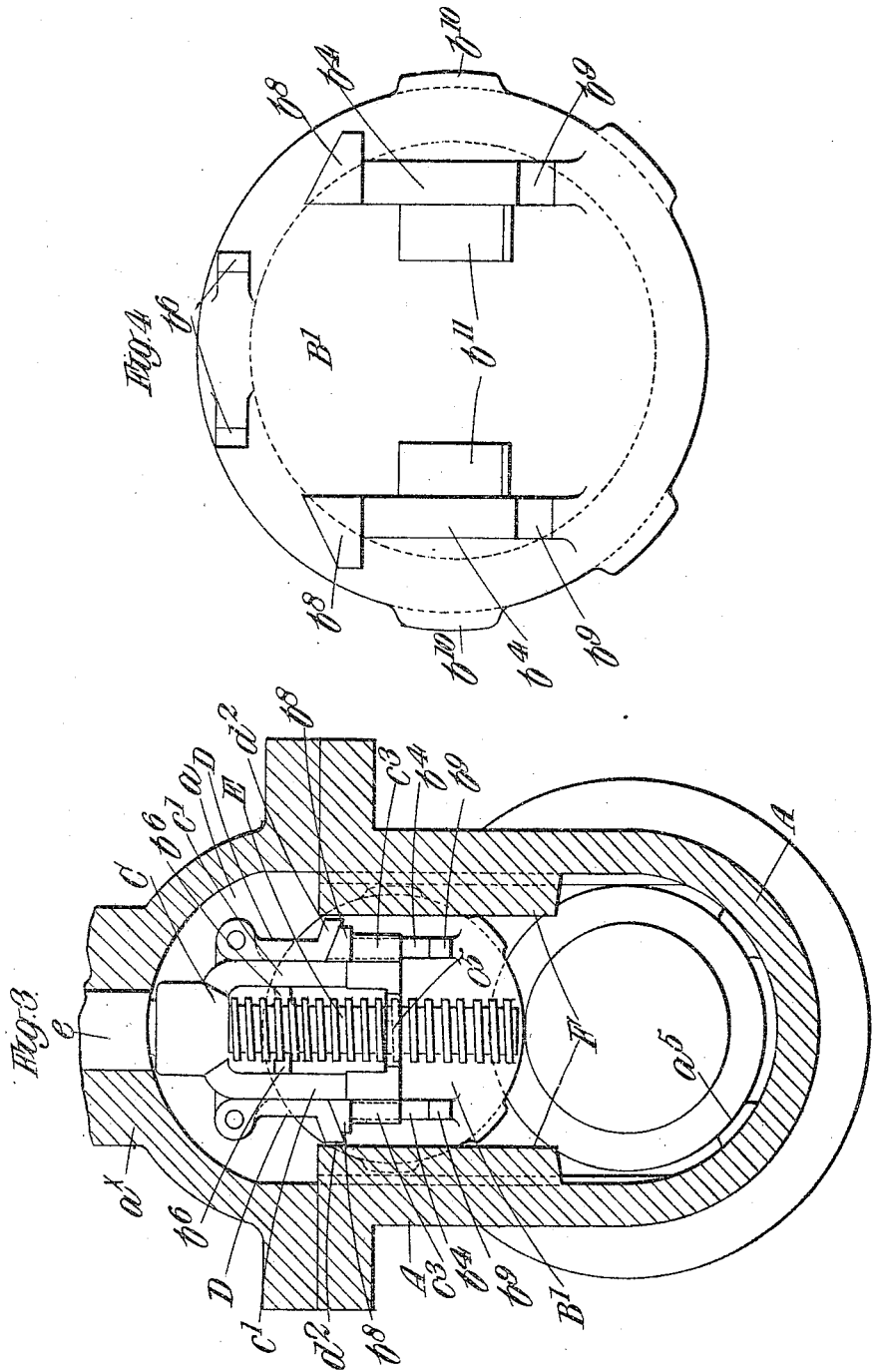

J. FLETCHER.
STOP VALVE AND THE LIKE.
APPLICATION FILED MAR. 6, 1909.
959,728.
Patented May 31, 1910.
5 SHEETS—SHEET 3.
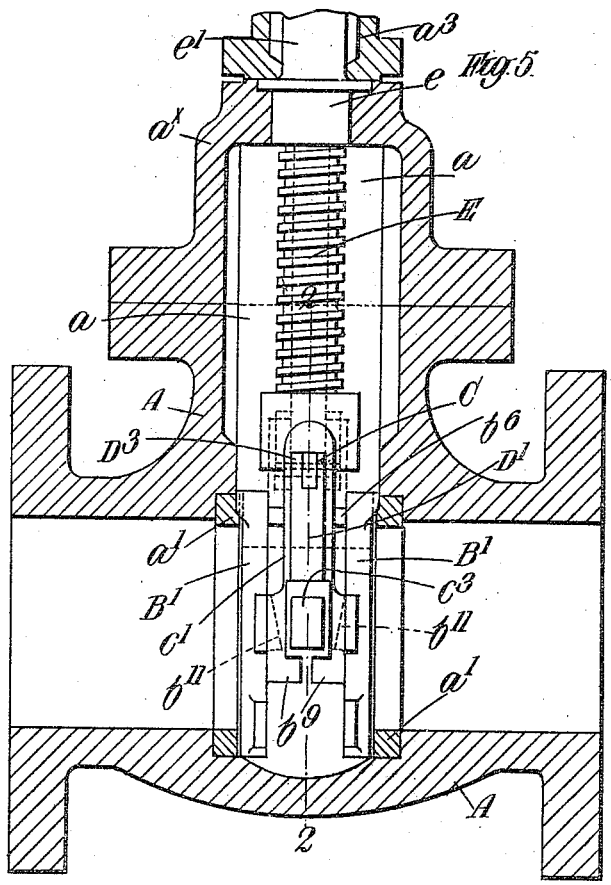
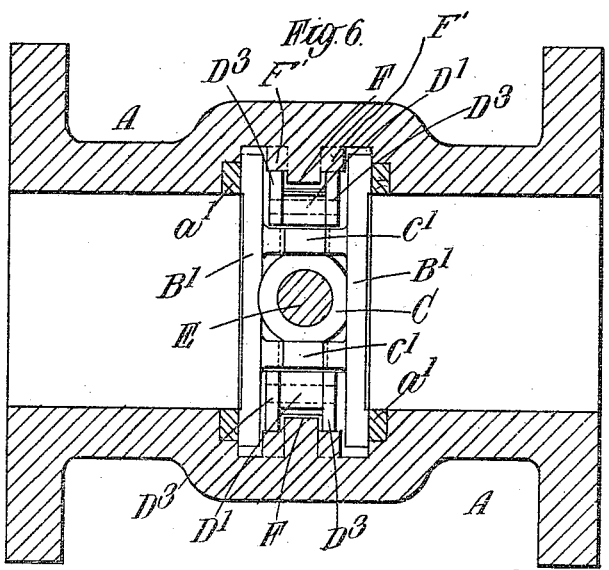

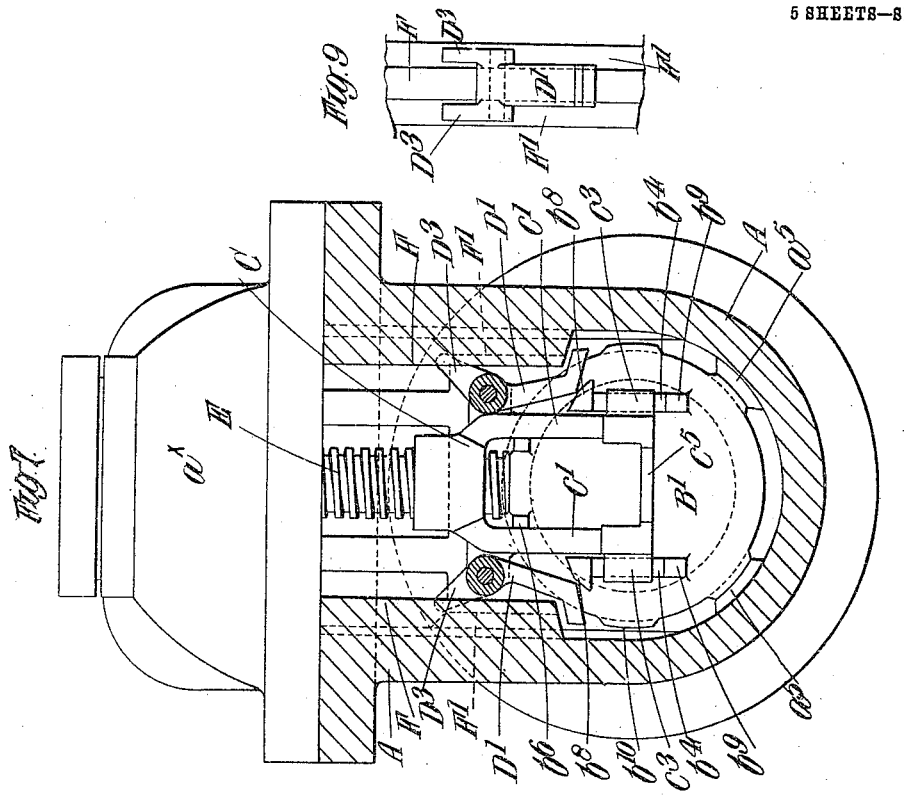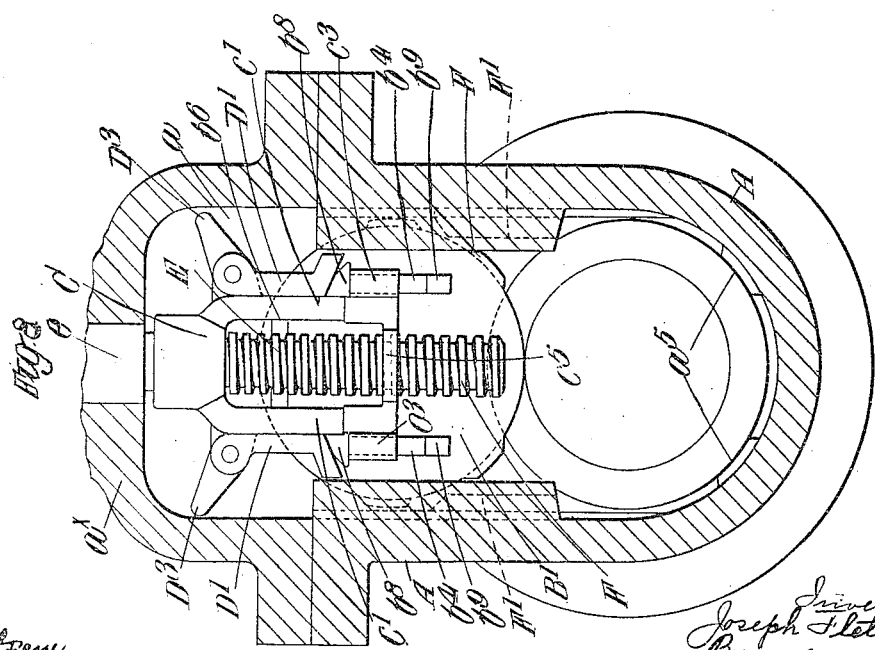

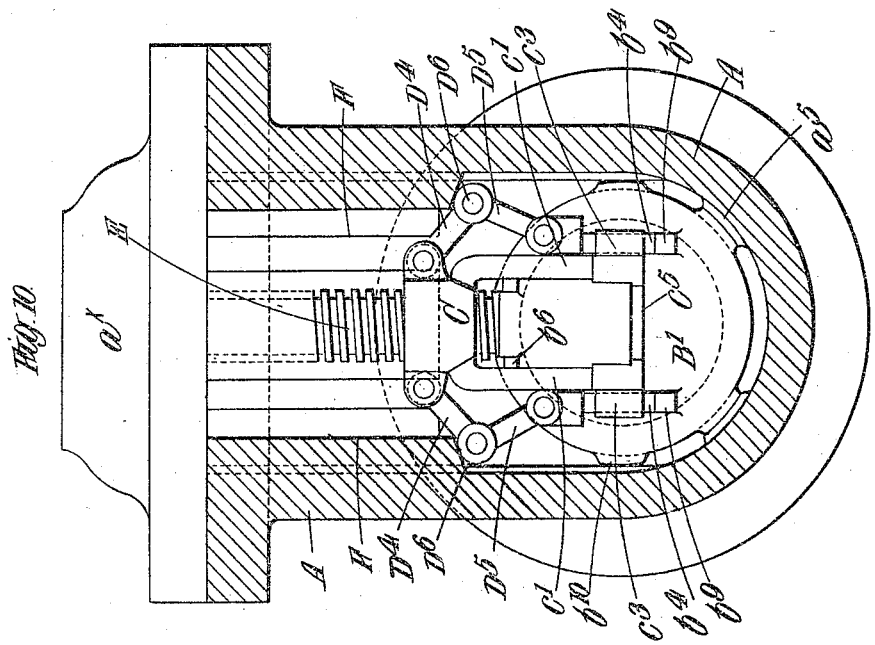
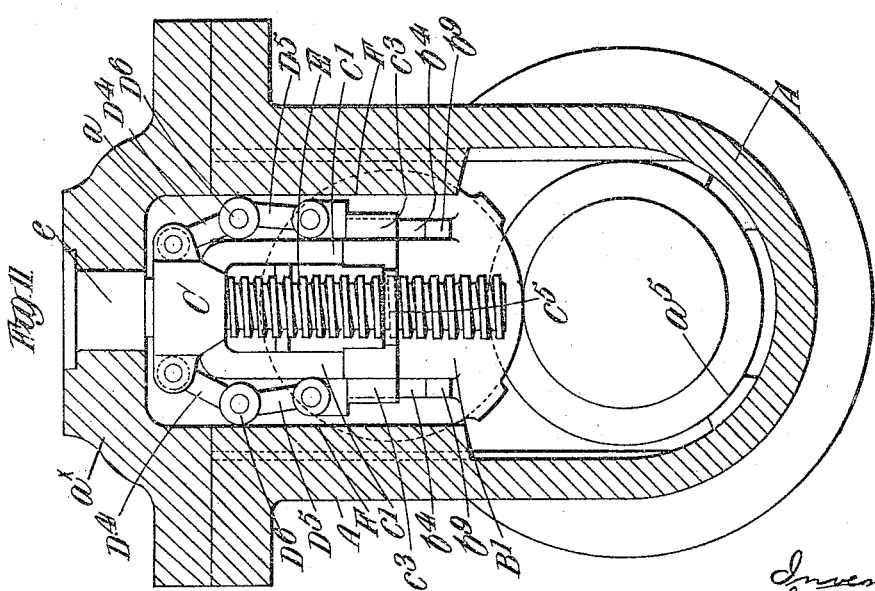

UNITED STATES PATENT OFFICE.

JOSEPH FLETCHER, OF STOKE NEWINGTON, ENGLAND, ASSIGNOR TO CLARK WAY HARRISON, OF LONDON, ENGLAND.

STOP-VALVE AND THE LIKE.

959,728.	Specification of Letters Patent.	Patented May 31, 1910.

Application filed March 6, 1909. Serial No. 481,664.

*To all whom it may concern:*

Be it known that I, JOSEPH FLETCHER, a subject of the King of Great Britain, residing at 36 Osbaldeston road, Stoke Newington, in the county of Middlesex, England, have invented certain new and useful Improvements in or Connected with Stop-Valves and the Like, of which the following is a specification.

This invention relates to stop valves for steam, gas, water or other fluid. It has reference particularly to valves of this kind in which the valve proper is adapted to move longitudinally and also laterally by its actuating screw, that is to say the valve proper comprises parallel disks or plates which during the completion of the longitudinal movement of the valve in closing are caused to slightly separate or move laterally and become pressed against their valve seats by the action of inclines or wedges brought into operation by the continued rotary movement of the valve actuating screw. In the class of such valves to which my improvements relate the aforesaid inclines or wedges form part of a reciprocating member or yoke engaging with the valve actuating screw, the said inclines or wedges being adapted to coöperate with corresponding inclines or wedges on the valve disks. The said reciprocating member or yoke is prevented from moving relatively to the valve disks during their longitudinal closing movement by the action of a loose nut carried by the said disks. This nut becomes disengaged from the said valve actuating screw as the valve disks complete their longitudinal movement in closing, so that the yoke can then move on the valve actuating screw and cause the said wedges or inclines to coöperate with one another for separating the valve disks and seating them on their valve seats.

It is the chief object of my invention to devise improved means for controlling the relative movement between the aforesaid wedges or inclines so as to dispense with the aforesaid loose nut, the use of which entails practical disadvantages which are overcome by the present invention. According to my invention the said reciprocating member or yoke is provided with a hinged member or members that restrain the reciprocating member or yoke from moving relatively to the valve disks during their longitudinal movement, the said hinged members being controlled by ribs, guides or the like on the valve casing in such manner that after the completion of the longitudinal closing movement of the valve disks, the hinged members will be liberated and will permit relative movement between the reciprocating member and the valve disks for effecting the lateral movement of the latter against their valve seats.

The aforesaid hinged members are of such a character that the force tending to restrain the relative movement between the yoke and the valve disks is transmitted through the hinges of the said members and the parts of the valve proper upon which they bear at the ends remote from the hinges. I do not intend to include by this term "hinged members" any device other than that which possesses the characteristic above stated.

I will describe my invention more fully with reference to the accompanying drawings in which:—

Figure 1 is a central longitudinal section of a stop valve embodying my improvements. Fig. 2 is a transverse section taken approximately on the line 1. 1 of Fig. 1, and showing the valve closed. Fig. 3 is also a transverse section similar to Fig. 2 but shows the valve open. Fig. 4 is an elevation of one of the valve-disks showing the back or inner face thereof. Fig. 5 is a central longitudinal section of a stop valve showing a modified form of my improvements applied thereto. Fig. 6 is a central longitudinal section of the same. Figs. 7 and 8 are transverse sections taken approximately on the line 2. 2 of Fig. 5 and showing the valve in its closed and open position respectively. Fig. 9 is a detail view hereinafter described. Figs. 10 and 11 are transverse sections similar to Figs. 7 and 8 but show a further modified form of my improvements.

Like letters of reference indicate similar parts in all the figures.

Referring first more particularly to Figs. 1 to 4, A designates the body of the valve casing provided with flanged ends for coupling it in any usual manner with sections of pipes forming part of a steam or other fluid main. Within the valve casing and intermediate of its ends there are two opposite valve seats $a'$ $a'$ which may be formed of rings screwed or otherwise fitted into circular recesses formed in the body of the valve casing. The upper part of the valve casing is provided with a chamber $a$ for the valve proper to enter when in its open position. In the example shown this chamber exists partly in the valve casing and partly in a cover or hood $a^x$ that is detachably secured to the valve casing by bolts extending through flanges on the said casing and the cover or hood.

$B'$ $B'$ designate the parallel disks or plates of the valve proper which receive their movement from the rotary screw E. This screw has a bearing $e$ in the upper part of the cover or hood $a^x$ and also has a shank $e'$ that passes through a stuffing box $a^3$ with which the said cover or hood is provided. Rotary motion is imparted to the said screw in the usual manner by means of a hand wheel at its outer end. C is the reciprocating member or yoke which in the example illustrated comprises a nut with which the inner or lower end of the said screw E engages, and two arms $c'$ $c'$ extending downwardly therefrom and terminating in two lateral fingers or projections $c^3$ $c^3$. The lower ends of the arms $c'$ $c'$ are preferably connected by a cross bar $c^5$ having a circular hole therein said cross-bar serving to impart increased rigidity to the structure.

The back or inner surface of each of the valve-disks is provided with two parallel straight ribs $b^4$ $b^4$ which lie opposite to the fingers or projections $c^3$ $c^3$. These ribs $b^4$ $b^4$ are recessed to form shoulders or projections $b^8$ $b^9$ at the top and bottom thereof. The fingers or projections $c^3$ $c^3$ of the yoke coöperate with the shoulders or projections $b^8$ when the screw E is revolved in a direction to cause the yoke to ascend, thus raising the valve disks and drawing them into the space $a$ within the hood or cover $a^x$. The valve disks are provided with lugs $b^6$ $b^6$ which bear against the inner side of the arms $c'$ $c'$ of the yoke and thereby prevent rotary motion of said valve disks without however interfering with sliding movement between the valve disks and the yoke lengthwise of the latter. The valve-disks may be provided with lugs $b^{10}$ for bearing against the sides of the valve casing so as to prevent edgewise movement of the valve disks in a direction transverse to the length of the yoke. In the body of the valve casing at the lower part thereof are stops $a^5$ $a^5$ for limiting the closing movement of the valve disks. The said valve-disks are also formed with pairs of inclines or wedges $b^{11}$ $b^{11}$ which coöperate with the inclines or wedges $c^8$ $c^8$ on the yoke-arms $c'$ $c'$ to permit the valve disks to move toward or away from each other and laterally against the valve seats $a'$ $a'$. Connected with the said yoke are two hinged members D, D each of which in the example shown has at its lower end a projection $d^2$ suitably inclined on its upper and lower surfaces, the said hinged members being adapted to coöperate with the aforesaid projections $b^8$ at the upper ends of the ribs $b^4$ $b^4$. The said projections $b^8$ are inclined on their upper surfaces to correspond with the inclination of the lower surfaces of the projections $d^2$ $d^2$. The fingers or projections $c^3$ engage with the projections $b^8$ to move the valve disks longitudinally during the opening of the valve. The said hinged members together with the inclined projections $b^8$ on the valve-disks operate to restrain the yoke from moving relatively to the valve-disks during the longitudinal movement of the latter by the force transmitted from the yoke through the hinges of the said hinged members and by the latter to the said projections $b^8$.

F F are vertical ribs or guides within the valve casing which are so arranged that during the longitudinal movement of the valve disks, the projections of the said hinged members D D slide in contact therewith and are thereby held in their inward position bearing against the projections $b^8$, the lower ends of these ribs or guides terminating in such a position as to insure that the valve disks shall occupy the proper position for closing the ports in the valve casing before the said hinged members D D are liberated by the ribs or guides.

In opening the valve, that is to say in moving the valve proper from the position shown by Fig. 2 to that shown by Fig. 3, the first part of the rotation of the screw E in the proper direction will raise the yoke without raising the valve disks $B^1$ $B^1$. This movement of the yoke will cause the inclines or wedges $c^8$ $c^8$ of the yoke to move upward and away from the inclines $b^{11}$ $b^{11}$ on the valve disks, thereby relieving the said valve disks of the pressure that tends to separate them. At the same time the upper inclined surfaces of the projections $d^2$ $d^2$ of the hinged members D D come against the lower inclined edges of the ribs or guides F F whereby the said hinged members will be caused to move inward toward each other so as to occupy their operative position shown by Fig. 3. This independent movement of the yoke will also bring the upper ends of the fingers or projections $c^3$ $c^3$ against the underside of the projections $b^8$ $b^8$ on the valve disks and the continued movement of the screw E will then raise the valve proper longitudinally into its fully open position, (Fig. 3). To close the valve the said screw E is revolved in the reverse direction, thus causing the yoke together with its hinged members D D to descend and carry with it the valve disks by the force transmitted through the hinged members and exterted on the upper inclined surfaces of the projections $b^8$ by the lower inclined surfaces of the projections $d^2$ $d^2$, the said hinged members being retained in their inward position by sliding against the said ribs or guides F. As soon as the said projections $d^2$ of the hinged members D D reach the lower ends of the ribs or guides F the valve disks will have reached a position in which they register with the ports or passage through the valve casing, whereupon the said hinged members D D are free to become liberated by moving outwardly under the action of the lower inclined surfaces of the projections $d^2$ $d^2$ on the correspondingly inclined surfaces of the projections $b^8$, the valve disks then resting on the stops $a^5$ $a^5$ in the body of the valve casing. The yoke being thus liberated will on the continued rotary movement of the screw E in the same direction, still further descend and its inclines $c^8$ $c^8$ will operate upon the inclines $b^{11}$ $b^{11}$ of the valve disks in such manner as to force the said valve disks away from each other and press them tightly against their valve seats $a'$ $a'$ thus securely closing the valve.

In the modification shown by Figs. 5 to 9 D' D' are the hinged members for restraining relative movement between the reciprocating member or yoke and the valve-disks during the longitudinal movement of the latter, the said hinged members being furnished with bifurcated extensions $D^3$ (Fig. 9) rigidly secured thereto. When the valve-disks are in their lowered or closing position these extensions $D^3$ come against secondary guides F' on the valve casing that operate to cause the said hinged members to move into their outward position as shown by Fig. 7 and thus liberate them. In this case the said hinged members do not depend upon the lower inclined surfaces of the projections $d^2$ $d^2$ coöperating with the corresponding inclined surfaces of the projections $b^8$ for the purpose of effecting the outward movement of the hinged members as in the previous arrangement, but are positively shifted outwardly by the secondary guides F' when the extensions $D^3$ come into contact with the latter. In other respects this modification is similar to that shown by Figs. 1 to 4. Rollers may be attached to the hinged members at the parts where they would otherwise bear against the projections $b^8$ or the guides F or F' so as to reduce friction at these parts.

In the modification shown by Figs. 10 and 11 the aforesaid hinged members for restraining relative movement between the yoke and the valve-disks during their longitudinal movement are of a flexible character, that is to say they consist of toggle levers or links $D^4$ $D^5$ connected together by a pivot $D^6$ which may be provided with an anti-friction roller. The upper links $D^4$ are pivoted to the yoke and the lower links $D^5$ are pivoted to the valve disks. When the valve disks are in the port closing position (Fig. 10) the said roller pivots $D^6$ lie below the lower ends of the ribs or guides F and the continued movement of the screw E causes the yoke to descend and effect the outward movement of the roller pivots $D^6$ whereupon the valve-disks are pressed against their valve seats by the wedging action above stated; this movement of the yoke being permitted by the bending of the said links as shown by Fig. 10. During the longitudinal movement of the valve-disks the said roller pivots $D^6$ travel along the said ribs or guides F and are thereby retained in their straightened condition as shown by Fig. 11 so that at such times no relative motion can take place between the yoke and the valve disks.

I would here state that I do not confine myself to the wedges or inclines above stated for causing the valve disks to separate and press against their valve seats after they have assumed their port closing position. Neither do I confine myself to the use of the particular forms of the hinged members hereinbefore described for restraining the reciprocating member or yoke from moving relatively to the valve disks so long as the force tending to restrain the relative movement between the yoke and the valve disks is transmitted through the hinge of the hinged members and the parts upon which they bear at the ends remote from the hinges. Neither do I desire to confine my improvements to valves having a longitudinally stationary screw or spindle, as my improvements are also applicable to valves in which the screw E is made to move longitudinally with the parts to which it is connected.

What I claim and desire to secure by Letters Patent of the United States is:—

1. In a stop valve, the combination with a longitudinally and laterally movable valve proper, of a device for imparting the longitudinal movement to the valve proper, a member carried by the said device and adapted to move relatively to the valve proper, hinged members bearing on the valve proper under the force transmitted from the movable member through the hinges, means for restraining the hinged members from leaving their force transmitting position until the valve proper completes its longitudinal closing movement, and means whereby said movable member then operates to impart the lateral movement to the valve proper independently of the hinged members.

2. In a stop valve, the combination with a longitudinally and laterally movable valve proper, of a device for imparting the longitudinal movement to the valve proper, a member carried by the said device and adapted to move relatively to the valve proper, hinged members connected to the movable member and bearing at their free ends on the valve proper under the force transmitted from the movable member through the hinges, means for restraining the hinged members from leaving their force transmitting position until the valve proper completes its longitudinal closing movement, and means whereby said movable member then operates to impart the lateral movement to the valve proper independently of the hinged members.

3. In a stop valve, the combination with a longitudinally and laterally movable valve proper, of a device for imparting the longitudinal movement to the valve proper, a member carried by the said device and adapted to move relatively to the valve proper, hinged members connected to the movable member and bearing at their free ends on the valve proper under the force transmitted from the movable member through the hinges, guides for restraining the hinged members from leaving their force transmitting position until the valve proper completes its longitudinal closing movement, and means whereby said movable member then operates to impart the lateral movement to the valve proper independently of the hinged members.

4. In a stop valve, the combination with a longitudinally and laterally movable valve proper, of a movable member for imparting the lateral movement to the valve proper, hinged members connected with the said movable member and coöperating with the said valve proper, extensions on said hinged members, means coöperating with said extensions for restraining the movement of the said hinged members relatively to the valve proper during the longitudinal movement of the latter, and means independent of the valve proper for liberating said hinged members as the valve proper completes its longitudinal closing movement.

5. In a stop valve, the combination with a longitudinally and laterally movable valve proper, of a movable member for imparting the lateral movement to the valve proper, hinged members connected with said movable member, projections on the valve proper with which said hinged members coöperate, means for restraining the movement of the said hinged members relatively to the said projections during the longitudinal movement of the valve proper, and means independent of the valve proper for liberating said hinged members as the valve proper completes its longitudinal closing movement.

6. In a stop valve, the combination with a longitudinally and laterally movable valve proper, of a movable member for imparting the lateral movement to the valve proper, hinged members connected with said movable member, inclined projections on the valve proper with which said hinged members coöperate, means for restraining the movement of the said hinged members relatively to the said inclined projections during the longitudinal movement of the valve proper, and means independent of the valve proper for liberating said hinged members as the valve proper completes its longitudinal closing movement.

7. In a stop valve, the combination with a longitudinally and laterally movable valve proper, of a reciprocating member for imparting the lateral movement to the valve proper, hinged members connected with said reciprocating member, projections on the valve proper with which said hinged members coöperate, projections on the free ends of said hinged members, and guides on the valve casing to coöperate with the projections on the said hinged members.

8. In a stop valve, the combination with a longitudinally and laterally movable valve proper, of a movable member for imparting the lateral movement to the valve proper, hinged members connected with said movable member for restraining the operation of the said movable member during the longitudinal movement of the valve proper, projections on the said hinged members, and means on the valve casing adapted to coöperate with the said projections in such a manner as to liberate the said hinged members as the valve proper completes its longitudinal movement for closing its port and to force the said hinged members into their restraining position before the valve proper begins its longitudinal port opening movement.

9. In a stop valve, the combination with a longitudinally and laterally movable valve proper, of a movable member, for imparting the lateral movement to the valve proper, hinged members connected with said movable member for restraining the operation of the said movable member during the longitudinal movement of the valve proper, inclined projections on the said hinged members, and means on the valve casing adapted to coöperate with the said projections in such a manner as to liberate the said hinged members as the valve proper completes its longitudinal movement for closing its port and to force the said hinged members into their restraining position before the valve proper begins its longitudinal port opening movement.

10. In a stop valve, the combination with a longitudinally and laterally movable valve proper, of a device for imparting the longitudinal movement to the valve proper, a member carried by the said device and adapted to move relatively to the valve proper, flexible members hinged at one end to the movable member and at the other end to the valve proper, means for restraining the hinged flexible members from bending during the longitudinal movement of the valve proper and for permitting the hinged flexible members to bend as the valve proper completes its longitudinal closing movement, and means whereby said movable member then operates to impart the lateral movement to the valve proper independently of the hinged flexible members.

11. In a stop valve, the combination with a longitudinally and laterally movable valve proper, of a device for imparting the longitudinal movement to the valve proper, a member carried by the said device and adapted to move relatively to the valve proper, flexible members hinged at one end to the movable member and at the other end to the valve proper, stationary guides for restraining the hinged flexible members from bending during the longitudinal movement of the valve proper and for permitting the hinged flexible members to bend as the valve proper completes its longitudinal closing movement, and means whereby said movable member then operates to impart the lateral movement to the valve proper independently of the hinged flexible members.

In testimony whereof I affix my signature in presence of two witnesses.

J. FLETCHER.

Witnesses:
C. W. HARRISON,
T. SELBY WORDLE.